United States Patent [19]
Christini
[11] Patent Number: 4,666,774
[45] Date of Patent: May 19, 1987

[54] STATIC RESISTANT X-RAY INTENSIFYING SCREENS

[76] Inventor: Theodore P. Christini, R.D. 1, Box 31, Dushore, Pa. 18614

[21] Appl. No.: 707,195

[22] Filed: Mar. 1, 1985

[51] Int. Cl.[4] .......... B32B 27/20; B32B 27/36; B32B 27/30; G01J 1/58

[52] U.S. Cl. .......... 428/330; 428/421; 428/422; 428/690; 428/691; 428/704; 428/913; 428/483; 428/910; 428/480; 428/461; 428/463; 427/44; 427/54.1; 250/483.1; 250/488.1; 378/185

[58] Field of Search .......... 428/330, 421, 422, 690, 428/691, 704, 913; 427/44, 54.1

[56] References Cited

U.S. PATENT DOCUMENTS

| | | | |
|---|---|---|---|
| 4,199,650 | 4/1980 | Mirtich et al. | 428/421 |
| 4,214,035 | 7/1980 | Herberger | 428/430 |
| 4,225,653 | 9/1980 | Brixner | 428/690 |
| 4,309,483 | 1/1982 | Gravert | 428/422 |
| 4,317,788 | 3/1982 | Imada et al. | 264/22 |
| 4,378,392 | 3/1983 | Segel | 428/421 |
| 4,438,164 | 3/1984 | Pfeifer et al. | 428/900 |
| 4,491,620 | 1/1985 | Joiner, Jr. | 428/910 X |

OTHER PUBLICATIONS

In the Matter of the Application of Chester W. Fitko, USCCPA Patent Appeal #76-721, Decided Jun. 2, 1977.

*Primary Examiner*—P. C. Ives

[57] ABSTRACT

X-ray intensifying screen comprising, in order, support; fluorescent phosphor containing active layer; and protective topcoat which is a flexible film of a fluorine containing polymer, the topcoat being energy treated under oxidative condition, e.g., corona discharge, etc., and having an antistatic agent applied thereto, e.g., from a solution containing at least 0.1% by weight of an anionic, cationic, nonionic or amphoteric antistatic agent. The X-ray intensifying screens have improved resistance to static.

15 Claims, No Drawings

STATIC RESISTANT X-RAY INTENSIFYING SCREENS

DESCRIPTION

1. Technical Field

This invention relates to X-ray intensifying screens. More particularly, this invention relates X-ray intensifying screens having a protective topcoat which are energy treated under oxidative condition and have an antistatic coating thereon.

2. Background of the Invention

X-ray intensifying screens are essential for use in conjunction with photographic silver halide X-ray films which generally have gelatino-silver halide emulsions coated on both sides of a support. The X-ray intensifying screen generally comprise, in order a support, an active layer comprising a fluorescent phosphor dispersed in a suitable polymeric binder, and a protective topcoat or abrasion layer coated over the active layer to protect the screen during use. A reflective layer, e.g., $TiO_2$ dispersed in a suitable binder, may also be present in the screen on either side of the support or incorporated directly into the support.

In use with X-ray films having both sides coated with the light-sensitive emulsion, two X-ray screens are usually employed, one on each side of the film, encased in a suitable book type cassette. The cassette is then placed in proximity to a patient in the area desired, and the patient is exposed to X-rays. The film is then removed and processed, much of this handling being done in the dark to protect the film from exposure to light.

Modern hospitals, which handle many X-rays daily, also use automatic changer and processing devices. These changer devices contain successive light-sensitive films and one or more X-ray screens. Each unexposed film is successively fed into position between a pair of X-ray screens, exposed, and automatically loaded. The feed path of the film changes abruptly near the entrance to the space between the screens. Conventional X-ray screens have protective topcoats, e.g., cellulose acetate or other polymeric materials, to shield the active layer from abrasion caused by the rapid exchange of the film in and out of the automatic changer systems. These protective topcoats were inadequate to shield the active layer of the X-ray screen from abrasion and, in addition tended to stain when accidently contacted by processing fluids, e.g., developer and fixer, associated with the film development. The useful life of the X-ray screen was impaired and the staining may cause unwanted image areas to appear on the film during exposure.

An improved X-ray screen has been developed by Joiner and disclosed in U.S. Pat. No. 4,491,620 granted Jan. 1, 1985 wherein the topcoat is particularly resistant to both abrasion caused by the automatic changer and staining caused by processing fluids. The topcoat of the Joiner invention comprises a copolymer of a fluoroester of the formula:

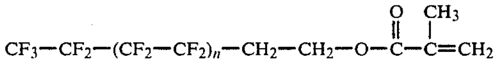

where n is an integer from 2 to 9, and methylmethacrylate. While the topcoat is advantageous as noted above and is said to be relatively static-free, it has been found that as X-ray film and X-ray screens are used in book cassettes or are transported or used in automatic changers with dispensing magazines some static develops. Often this static is stored and subsequently is discharged from the screen surfaces onto the X-ray film. Static artifacts on the X-ray film are objectionable to radiologists as they can cover critical areas of a radiograph or can be read as a false pathology. Antistats added to the topcoat or to the active layer have been found not to completely control the static problem.

It is desirable to provide X-ray intensifying screens which prevent or materially reduce static build-up and subsequent discharge of the static on X-ray film. Furthermore, it is desirable to provide X-ray screens which, in addition, are substantially abrasion resistant and free from stain caused by processing fluids.

BRIEF SUMMARY OF THE INVENTION

In accordance with this invention there is provided an X-ray intensifying screen comprising, in order, a support, an active layer on the support comprising fluorescent phosphor particles dispersed in a film forming binder, a protective topcoat on the active layer which is a flexible film of a fluorine containing polymer, the improvement whereby the topcoat is energy treated under oxidative conditions and an antistatic agent is applied thereto.

DETAILED DESCRIPTION OF THE INVENTION

An X-ray intensify screen comprising, in order, a support, an active fluorescent phosphor coating layer and a protective topcoat which can be used to form the improved X-ray intensifying screen of this invention is disclosed in Joiner, U.S. Pat. No. 4,491,620, which is incorporated herein by reference. While U.S. Pat. No. 4,491,620 discloses particular fluoroesters employed in the protective topcoat, e.g., as disclosed in U.S. Pat. Nos. 3,542,461 and 3,282,905, it has been found that the properties of the present X-ray intensifying screen are not substantially affected when other fluorine containing polymers are present in the protective topcoat provided the topcoat is adequately resistant to abrasion, e.g., that caused by an automatic changer, and staining, e.g., that caused by processing fluids. Static charge is found to develop on the surface of the topcoat which has not undergone further treatment according to this invention. Fluorine containing polymers useful in this invention generally are represented by the following formula:

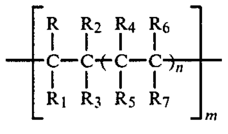

wherein n is an integer from 0 to about 10, and m is an integer from 50 to 150,000. Generally, R, $R_1$, $R_2$, $R_3$, $R_4$, $R_5$, $R_6$ and $R_7$ are either F or H, with the proviso that at least three of said R to $R_7$ groups are fluorine. In one embodiment wherein at least $R_4$ and $R_6$ are fluorine, $R_5$ and $R_7$ when taken together form a five membered ring

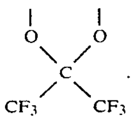

In another embodiment, $R_2$ and $R_6$ are $-CH_3$ and $R_3$ is $-CO_2CH_3$ and $R_7$ may also be $-CO_2-CH_2-CH_2C_BF_{2B+1}$ where B is 3 to 20.

Specific fluorine containing polymers include: the preferred fluoroester of the formula:

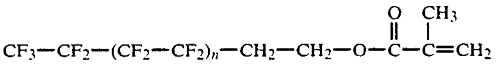

where n is an integer from 2 to 9, and more preferably 3 to 5, copolymerized with methylmethacrylate, 3% to 98% by weight of the fluoroester, preferably 80% by weight of the fluoroester; a short chain telomer of tetrafluoroethylene, e.g., 20% by weight solids in 80% Freon ®TF solvent which is trichlorotrifluoroethane (Vydax ®AR, E. I. du Pont de Nemours and Company, Wilmington, DE); mixture of fluoroester of the above formula wherein n is preferably 3 to 5 copolymerized with methylmethacrylate (20% by weight) and telomer of tetrafluoroethylene (80% by weight); copolymer of a perfluorodimethyldioxole and tetrafluoroethylene; etc.

The topcoat layer is present on a supported layer of well-known X-ray luminescent phosphors or phosphor particles, e.g., dispersed in a suitable polymer binder. These layers are described in Joiner, U.S. Pat. No. 4,491,620, incorporated herein by reference. A preferred support is a polymeric film, e.g., polyethylene terephthalate which can be coated with a subbing layer. The thickness of the support is from about 0.0025 inch (0.0064 cm) to 0.03 inch (0.0762 cm), preferably 0.01 inch (0.0254 cm). Dyes or finely divided pigments, e.g., $TiO_2$, may be coated on or dispersed in the support. A reflective layer may be coated on the support either as a backing layer or interposed between the support and the active (phosphor) layer. The reflective layer, if present, may be coated at a thickness of about 0.0003 inch (0.0007 cm) to about 0.001 inch (0.00254 cm) or more. Preferably the reflective layer is dispersed in a binder such as that described by Brixner, Example 1 of U.S. Pat. No. 3,895,157 which is incorporated herein by reference.

The phosphor containing layer can use any of many known luminescent phosphors or phosphor particles which can be dispersed in any one of a host of polymeric binder systems. A preferred phosphor is $YTaO_4$:0.002 Tm. The phosphors are traditionally dispersed by milling with a binder, e.g., polyvinyl butyral, in suitable solvents and are coated on the support by well-known methods to a thickness of 0.004 to 0.014 inch (0.010 to 0.036 cm). The term "phosphor" or "active layer", as used herein, will denote any suitable phosphor that luminesces on exposure to X-rays and is coated in a binder on a support. The luminescence may occur in the portion of the spectrum from 300 to 700 nm depending on which phosphor is used.

In order for the fluorine containing polymer topcoat to resist static charge build-up, e.g., which may occur during continued use with book cassettes, or during transport or use in automatic changers with dispersing magazines, a combination of two treatments is applied to the topcoat. The first is the topcoat is energy treated under oxidative conditions. By "energy treated under oxidative conditions" as used herein means a surface treated by electric spark, corona discharge, flame treatment, etc. Without limiting the invention, it is believed that these treatments break the carbon-fluorine bonds and form carboxyl groups on the surface of the topcoat. These sites are then available for bonding under the second treatment, which may be an application of an antistatic solution containing at least 0.1% by weight of antistatic agent. When either of the two treatments is not used static charge builds up on the X-ray intensifying screen.

The energy treatment is applied under oxidative conditions, i.e., at 760 Torr, not under vacuum or low atmospheric pressure conditions or in an inert gas atmosphere. Suitable energy treatments include: corona or electron discharge (ED treatment) using a corona treatment device, e.g., Power Device Model RS-32 manufactured by ENI Power Systems, Inc., 3000 Winton Road, South, Rochester, N.Y., wherein the energy/unit area (E/A) values are in the range of 50 to 300 or more; high intensity ultraviolet generating source wherein ozone is generated, e.g., PS-7125 UV Processor, Argus International, Hopewell, N.J.; flame treatment devices known to those skilled in the art; etc.

The E/A values (treatment index) are determined by the formula:

$$\frac{\text{Watts} \times 100}{\left(\begin{array}{c}\text{line speed}\\\text{in feet/min}\end{array}\right)\left(\begin{array}{c}\text{treatment}\\\text{width in inches.}\end{array}\right)}$$

For example, with a 10 inch (25.4 cm) bar at 0.020 to 0.050 inch (0.51 to 1.27 mm) gap-screen surface to treater bar-at 1500 watts and 50 feet/minute (15.24 meters/minute) film speed, $$E/A = \frac{1500 \times 100}{50 \times 10} = 300.$$

Subsequent to the energy treatment of the X-ray intensifying screen topcoat, preferably immediately after treatment or up to three weeks or more following energy treatment, the topcoat surface is treated by known coating or application means with a suitable antistatic agent. The antistatic agents include: anionic, cationic, nonionic or amphoteric types. The antistatic agents can be applied, e.g., wiped on at full strength or dissolved, dispersed or emulsified in a suitable solvent or mixture of solvents at a concentration of at least 0.1% by weight antistatic agent. The useful range of the antistatic agent is 0.1 to 100% by weight, preferably 1 to 10% by weight in a solvent.

The anionic surface active agents are exemplified by sulfonated oils, soaps, sulfonated ester oils, sulfonated amide oils, sulfonated ester salts of olefins, sulfonated ester salts of aliphatic alcohols, ester salts of alkylsulfuric acids, ethylsulfonic acid salts of fatty acids, salts of alkylsulfonic acids, salts of alkylnaphthalenesulfonic acids, salts of alkylbenzene-sulfonic acids, succinic acid ester sulfonates and salts of phosphoric acid esters; the cationic surface active agents are exemplified by salts of primary amines, salts of secondary amines, salts of tertiary amines, quaternary ammonium salts and pyridinium salts. Nonionic surface active agents are exemplified by addition products of ethylene oxide with fatty acids, aliphatic amides, alkylphenols, alkylnaphthols, partial carboxylic acid esters of polyvalent alcohols, etc. and block copolymers of ethylene oxide and propylene oxide and the amphoteric surface active agents are exemplified by derivatives of carboxylic acids and derivatives of imidazolines.

Specific anionic antistatic agents include: mixed mono- and dialkyl phosphates of the general structure $RH_2PO_4$ and $R_2HPO_4$, where R is alkyl of 8 to 10 carbon atoms.

Specific cationic antistatic agents include: quaternary ammonium derivative of a fatty acid (fatty imidazoline) Aston ®OI, Lyndal Chemical Co., Dalton, Ga., SPAC ® Concentrate, Kleen Chemical Co., Chicago, Ill., Zelec ®DP, polymeric quaternary ammonium salt, E. I. du Pont de Nemours and Company, Wilmington, DE.

Specific nonionic antistatic agents include: Merpol ®HCS Surfactant, an ethoxylated alcohol, Merpol ®DA Surfactant, an ethoxylated amine, both manufactured by E. I du Pont de Nemours and Company, Wilmington, DE.

Specific amphoteric antistatic agents include: cetyl betaine; fluorochemical surfactant (e.g., Zonyl ®FSK, E. I. du Pont de Nemours and Company, Wilmington, DE).

After the antistatic coating is applied and is dried the X-ray screen can be used in the normal fashion. One means for testing the screen surface for static or charge is by using a Zerostat ®3 gun, discwasher, 1407 N. Providence Road, P.O. Box 6021, Columbia, MO, to determine the success of the combination of treatments. The gun is a device used to discharge static by releasing alternate streams of positive and negative ions onto a surface. This gun contains a piezo-electric crystal that upon the application and release of mechanically applied pressure will alternately produce negative and positive ions. Thus by using only one portion of the operation cycle of this gun, one can place either negative or positive charge onto the surface. When operating in this mode, the gun no longer discharges static, but instead places either a net positive or negative charge on the surface. A preferred embodiment of the invention is described in Example 1, Sample 3.

INDUSTRIAL APPLICABILITY

The X-ray intensifying screens are suitable for all X-ray radiographic processes. The screens having the fluorine polymer containing topcoats are particularly susceptible to static build-up in book cassettes. This invention solves this problem without affecting processibility in modern rapid changer systems, e.g., Cut Film Changer Type AOT-R, or PUCK, sold by Elema-Schonander, Sweden, and the Buckymat Automatic Film Changer sold by Buckymat, Seimens Corp., Federal Republic of Germany. In these rapid changer systems or simulators, the protective topcoat coated over a phosphor layer survives well without topcoat failure is highly resistant to stain; and, in addition, is substantially free from static buildup, e.g., during transport in an automatic changer. The X-ray screens can be used over and over again and still retain these advantages.

EXAMPLES

The invention is illustrated by but is not intended to be limited to the following examples wherein the parts and percentages are by weight.

EXAMPLE 1

A reflective suspension (b) was prepared by sand milling the following ingredients:

| Ingredient | Amount (g) |
|---|---|
| Titanium dioxide | 100 |
| Chlorosulfonated polyethylene | 40 |
| n-butyl acetate | 124 |
| Mixed petroleum naptha (Initial BP 247° F. (120° C.), API Gr. 59-61 at 60° F. (16° C.), Sp Gr 0.7385 | 84 |
| Dioctyl ester of sodium sulfosuccinic acid | 2 |
| Polymeric organic silicone solution (2% in toluene) | 2 |

The milled suspension was filtered, coated on a 0.010 inch (0.0254 cm) thick biaxially oriented polyethylene terephthalate film sheet (a) to a wet thickness of 0.010 inch (0.0254 cm) and dried. Multiple samples were prepared.

A phosphor suspension (c) was prepared by milling the following ingredients in a ball mill for about 16 hours:

| Ingredient | Amount (g) |
|---|---|
| $YTaO_4$:.002 Tm | 700 |
| Polyvinyl butyral (PVB) binder solution | 342 |

The PVB solution was composed of the following ingredients:

| Ingredient | Amount (g) |
|---|---|
| n-butyl acetate | 164.0 |
| n-propanol | 164.0 |
| Polymeric organic silicone solution (2% by wt. in toluene) | 8.1 |
| Potassium salt of monoethylphenyl-phenolmonosulfonic acid | 2.2 |
| Glycerol monolaurate | 13.5 |
| Polyvinyl butyral (granular, Intrinsic Visc. 0.81) | 54.0 |

The phosphor suspension was then coated over the reflective layer on the sample made above. These elements were also dried.

A topcoat solution (d) was prepared from the following ingredients:

| Ingredient | Amount (g) |
|---|---|
| Copolymer of a fluoroester[(1)] (80 parts) and methylmethacrylate (20 parts) made according to the teaching of Example 1, U.S. Pat. No. 3,950,315 | 400.0 |
| Freon ® TA - fluorocarbon solvent (E. I. du Pont de Nemours and Company) | 5000.0 |
| Zelec ® 2457E[(2)] | 4.76 |

[(1)] $CF_3-CF_2-(CF_2-CF_2)_n-CH_2-CH_2-O-C(=O)-C(CH_3)=CH_2$, n is 3 to 5.

[(2)] anionic antistatic agent of mixed mono- and dialkyl phosphates of the general structure $RH_2PO_4$ and $R_2HPO_4$, where R is $C_8$ to $C_{10}$ alkyl, E. I. du Pont de Nemours and Company, Wilmington, DE The topcoat solution was then coated over the phosphor layer of the samples made above and dried to provide a fluorescent screen having (a) a support, (b) a reflective layer, (c) an active phosphor layer, and (d) a protective topcoat representing the prior art on which the improvement of this invention is made.

Zelec ®2457E antistatic agent described above was dissolved in isopropanol to give a 10% antistatic solution. Seven (7) samples of the X-ray screen made above were used for this example. The topcoat surface (d) of each of the samples was energy treated at various levels using a corona treatment device(3) which uses a corona discharge (ED treatment) to produce oxidative treatment of a surface brought in contact therewith. Each sample was passed through the treatment station with a 0.020-0.050 inch (1.51-1.27 mm) gap at various speeds to control the residence to about 0.1 second. The energy supplied in watts to the discharge unit was varied to give different energy/unit area (E/A) values. After treatment, each screen was wiped with a solution as indicated below and the surface tested by use of the Zerostat ®3 gun technique to see if it would resist the accumulation of a positive charge applied thereon. The following results obtained are set forth in Table 1.

(3) Power System Model RS-32 manufactured by ENI Power Systems, Inc., 3000 Winton Road, South, Rochester, N.Y., maximum generator power output 3000 watts into 50 ohms.

TABLE 1

| Sample | ED Treatment E/A Value | Type Solution Applied | Static Resistance |
|---|---|---|---|
| 1 | 50 | 10% antistat | Excellent |
| 2 | 150 | 10% antistat | Excellent |
| 3 | 300 | 10% antistat | Excellent |
| 4 - Control A | 100 | isopropanol | Poor |
| 5 - Control B | 300 | isopropanol | Poor |
| 6 - Control C | 300 | water | Poor |
| 7 - Control D | 300 | none | Poor |

As can be seen from the above results energy treatment alone, or in combination with a wipe-on treatment of water or isopropanol, did not improve the resistance of the screen surface to the generation of a static charge. Energy treatment at low to high levels together with a wipe-on treatment of the antistat solution did reduce the propensity of the screen surface to accept a static charge.

EXAMPLE 2

Solutions of the Zelec ®2457E antistatic agent described in Example 1 (from 0.1% by weight to 10% by weight) were made up in isopropanol. Seven (7) more screen samples as described in Example 1 were energy treated as described in Example 1 at various E/A levels, the surface then treated with a solution as set forth in Table 2 below, and the propensity of the screen to accept a static charge measured with the following results.

TABLE 2

| Sample | ED Treatment E/A Value | Type Solution Applied | Static Resistance |
|---|---|---|---|
| 1 | none | none - control | Poor |
| 2 | 100 | 10% antistat | Excellent |
| 3 | 300 | 10% antistat | Excellent |
| 4 | 100 | 1% antistat | Excellent |
| 5 | 300 | 1% antistat | Excellent |
| 6 | 100 | 0.1% antistat | Fair |

TABLE 2-continued

| Sample | ED Treatment E/A Value | Type Solution Applied | Static Resistance |
|---|---|---|---|
| 7 | 300 | 0.1% antistat | Excellent |

This example demonstrates that application of a low level of antistat solution (see Sample 7) can be used with increased energy treatment.

EXAMPLE 3

A cationic antistatic agent, a quaternary ammonium derivative of a fatty acid (fatty imidazoline), Aston-®OI(1) was used as described in Table 3 below. Three (3) screen samples prepared as described in Example 1 were energy treated at various levels and then a wipe-on solution of 20% of the above antistat in water was applied to the surface with the following results:

(1) Lyndal Chemical Co., Dalton, Ga.

TABLE 3

| Sample | ED Treatment E/A Value | Type Solution Applied | Static Resistance |
|---|---|---|---|
| 1 | none | none - control | Poor |
| 2 | 100 | 20% antistat | Excellent |
| 3 | 300 | 20% antistat | Excellent |

EXAMPLE 4

A cationic antistatic agent, quaternary ammonium derivative, SPAC ® Concentrate(1) approximately 1% antistat in isopropanol was used in this example using screen samples prepared as described in Example 1 with the results set forth in Table 4.

(1) Kleen Chemical Manufacturing Co., Chicago, Ill.

TABLE 4

| Sample | ED Treatment E/A Value | Solution Applied | Static Resistance |
|---|---|---|---|
| 1 | none | none - control | Poor |
| 2 | 100 | yes | Excellent |
| 3 | 300 | yes | Excellent |

All of the screen samples made as described above in Examples 1 to 4 were tested as X-ray screens by preparing a radiograph using samples of Cronex ®-4 medical X-ray film manufactured by E. I. du Pont de Nemours and Company, Wilmington, DE, i.e., a high speed gelatino-AgIBr emulsion coated double side on a 0.007 inch (0.18 mm) biaxially oriented polyethylene terephthalate film support. Each sample was exposed to each screen in a conventional manner and developed, fixed, washed and dried. Samples were evaluated using a test target and/or a hand phantom to evaluate image sharpness and all were found to be acceptable. The Zelec ®2457E samples were also tested for speed by means of a test target and found to be acceptable. This indicates that the treatment of this invention did not affect image quality. The screens have acceptable wear characteristics.

EXAMPLE 5

In order to demonstrate another energy treatment device, screen samples prepared as described in Example 1 were placed under a high intensity UV generating source PS-712S UV Processor, Argus International Co., P.O. Box 38, Hopewell, N.J. During exposure in this device, ozone is generated. Two samples were passed through this device at 10 feet/minute (3.05 meters/minute) (gives 2.5 joules/$cm^2$) and 30 feet/minute (9.14 meters/minute) (gives 0.6 joules/$cm^2$). Both samples were then treated with the antistatic solution (10%) described in Example 1 and had good resistance to static indicating that the surfaces had been energy treated in the manner required by this invention.

EXAMPLE 6

In order to demonstrate the efficacy of the process of this invention to eliminate static buildup on X-ray screens, topcoats were prepared from a number of fluorine containing polymers to be coated on a phosphor layer as described in Example 1. These topcoats were prepared as described below:

Composition 1:

30 g of Vydax ® AR Fluorotelomer Dispersion, a white, short chain telomer of tetrafluoroethylene, 20% solids in 80% Freon ® TF solvent and 30 g of Freon ® TF Solvent, trichlorotrifluoroethane, were mixed giving a 10% solids solution. Freon ® is a registered trademark of E. I. du Pont de Nemours and Company, Wilmington, DE. Coatings were made on screens made as described in Example 1 wherein this composition was substituted for solution (d) described therein. Two samples were prepared with two different thicknesses of topcoat, 0.005 inch (0.13 mm) and 0.015 inch (0.38 mm), respectively.

Composition 2:

The topcoat for this sample was made by applying 10 spray coats from mixture of a short chain telomer of tetrafluoroethylene (20%) in Freon ® TF Solvent (80%), Crown ® 6078, Crown Industrial Products Co., Hebron, Ill.

Composition 3:

A solution of a mixture of fluorine containing polymers was made as follows:

| | |
|---|---|
| Vydax ® AR (see Composition 1) | 24.0 g |
| Copolymer of fluoroester from Example 1 | 1.2 g |
| Acetone | 5.4 g |
| Freon ® TF Solvent | 24.6 g |

This solution (ca. 11% solids) was used to coat three screen samples at 0.005 inch (0.13 mm), 0.010 inch (0.25 mm), and 0.015 inch (0.38 mm) thicknesses, respectively.

The samples prepared as described above were all tested without further treatment for static susceptibility. Then, each sample was given a corona discharge ED treatment as described in Example 1, E/A value is 300, and tested for static susceptibility. Finally, each sample was treated by wipe-on of the antistat solution described in Example 1 (10% Zelec ® 2457E in isopropanol). Static resistance was noted only in those cases where ED treatment and the antistat solution were applied as taught by this invention.

EXAMPLE 7

Four (4) screen samples were prepared as described in Example 1. Sample 1, Control, was prepared without further treatment (e.g., no electron discharge, no antistat solution wipe on). Sample 2 was prepared as Sample 3, Example 1 (e.g., ED treatment at 300 E/A and 10% solution of Zelec ® 2457E antistat). Sample 3 was also ED treated and the antistat applied without a solvent (Aston ® OI, a cationic antistatic agent, Lyndal Chemical Co., Dalton, GA., a fatty imidazoline described in Example 3). Sample 4 was identical to Sample 3 except for the antistat which was also applied without solvent (Zelec ® 2457E, an anionic antistat as described in Example 1). These screens were also tested for a propensity to static as previously described with the following results set forth in Table 5:

TABLE 5

| Sample | ED Treatment | Antistat Applied | Static Resistance |
|---|---|---|---|
| 1 - Control | No | No | Poor |
| 2 | Yes | Yes - In Solvent | Excellent |
| 3 | Yes | Yes - No Solvent | Excellent |
| 4 | Yes | Yes - No Solvent | Excellent |

This example demonstrates that it is not necessary to apply the antistat in a solvent. Most of the common antistats are high boiling, waxy compounds and they can be simply wiped on the surface of the X-ray screen to perform as described. However, it is preferred to apply the antistat in a solvent so as to apply a thinner coating thereon and for ease of handling.

EXAMPLE 8

Five (5) screen samples were prepared as described in Example 1. Sample 1, Control, was prepared and tested without further treatment (e.g., no electron discharge, no antistat solution wiped on). Samples 2 and 3 had only an electron discharge treatment of the surface at two levels of E/A. Samples 4 and 5 had the same ED treatment as 2 and 3 and were further treated by wipe-on of the antistat solution of Example 1 (10% Zelec ® 2457E in isopropanol) with the following results:

TABLE 6

| Sample | ED Treatment E/A Value | Antistat Solution Applied | Static Resistance |
|---|---|---|---|
| 1 - Control | none | none | Poor |
| 2 | 90 | none | Poor |
| 3 | 150 | none | Poor |
| 4 | 90 | yes | Excellent |
| 5 | 150 | yes | Excellent |

EXAMPLE 9

In order to test yet another fluorine containing polymer as the overcoat layer for an X-ray screen within the ambit of this invention a copolymer of perfluorodimethyldioxole and tetrafluoroethylene (ca. 30/70 ratio) was prepared. This material was then applied as the topcoat layer (d) on a screen made according to Example 1. This screen was then tested for resistance to static before any treatments and after each treatment: (1) corona discharge (300 E/A); and (2) wipe-on of antistat (10% Zelec ® 2457E in isopropanol). The screen with both treatments had excellent static resistance while the screen without any treatment (control) or with corona discharge treatment alone were poor.

EXAMPLE 10

In order to demonstrate the utility of this invention when screens made according to the teachings herein are used in an automatic changer, four (4) pairs of screen samples were made up according to Example 1. Sample pair 1 was kept as the Control without further treatment. Sample pairs 2, 3 and 4 were all corona discharge treated at 300 E/A. Sample pair 2 was further treated by wipe-on of 0.1% Zelec ®2457E antistat in isopropanol. Sample pair 3 by a wipe-on of a 1% solution of the same antistat and Sample pair 4 by a wipe-on of a 10% solution of the same antistat. A pair of each of the above screens was then tested in an automatic changer (Schonander AOT, Elema-Schonander, Sweden) by passing 500 sheets of film through with each sample pair and inspecting every 50th sheet of film for static propensity with the following results:

TABLE 7

| Sample | ED Treatment | Antistat Solution Applied | Static Results |
|---|---|---|---|
| 1 - Control | none | none | Poor |
| 2 | yes | 0.1% | Fair |
| 3 | yes | 1% | Excellent |
| 4 | yes | 10% | Excellent |

In addition, each pair of screens was examined to see whether or not they showed wear from the handling and use in the automatic changer. All were in good shape with little evidence of surface wear which indicates that the surface treatments of this invention have no deleterious effect on the durability of the overcoat layer.

EXAMPLE 11

In order to demonstrate the use of nonionic and amphoteric antistats within the ambit of this invention, eight (8) screens were made up according to Example 1. Sample 1, the control, was not treated while Samples 2-8 were all corona discharge treated at 300 E/A and antistats then applied as shown below. Each screen was then tested for a propensity to hold a static charge as previously described with the following results set forth in Table 8.

TABLE 8

| Sample | ED Treatment | Antistat Applied | Static Resistance |
|---|---|---|---|
| 1 - Control | None | None | Poor |
| 2 | Yes | Pure Merpol ® HCS[1] | Excellent |
| 3 | Yes | Pure Merpol ® DA[2] | Excellent |
| 4 | Yes | 10% Merpol ® DA in alcohol | Excellent |
| 5 | Yes | Pure Product BCO[3] | Excellent |
| 6 | Yes | 10% Product BCO in alcohol | Excellent |
| 7 | Yes | Pure Zonyl ® FSK[4] | Excellent |
| 8 | Yes | 10% Zonyl ® FSK in alcohol | Excellent |

[1]a nonionic antistat, ethoxylated alcohol, E. I. du Pont de Nemours and Company, Wilmington, DE.
[2]a nonionic antistat, ethoxylated amine, E. I. du Pont de Nemours and Company, Wilmington, DE.
[3]an amphoteric antistat, cetyl-betaine, E. I. du Pont de Nemours and Company, Wilmington, DE.
[4]an amphoteric antistat, fluorochemical surfactant, E. I. du Pont de Nemours and Company, Wilmington, DE.

I claim:

1. An X-ray intensifying screen comprising, in order, a support, an active layer on the support comprising fluorescent phosphor particles dispersed in a film forming binder, a protective topcoat on the active layer which is a flexible film of a fluorine containing polymer, the improvement whereby the topcoat is energy treated under oxidative conditions and an antistatic agent is applied thereto.

2. An X-ray intensifying screen according to claim 1 wherein the antistatic agent is applied from a solution containing at least 0.1% by weight antistatic agent.

3. An X-ray intensifying screen according to claim 1 wherein the antistatic agent is applied from a solution containing 1 to 10% by weight antistatic agent.

4. An X-ray intensifying screen according to claim 1 wherein the protective topcoat is a flexible film of a copolymer of (1) a fluoroester of the formula:

$$CF_3-CF_2-(CF_2-CF_2)_n-CH_2-CH_2-O-\overset{\overset{\Large O}{\|}}{C}-\overset{\overset{\Large CH_3}{|}}{C}=CH_2$$

wherein n is an integer from 2 to 9, and (2) methylmethacrylate.

5. An X-ray intensifying screen according to claim 1 wherein the energy treatment under oxidative condition is a corona discharge treatment with energy/unit area (E/A) values in the range of 50 to 300.

6. An X-ray intensifying screen according to claim 1 wherein the energy treatment under oxidative condition is a high intensity ultraviolet generating source generating ozone.

7. An X-ray intensifying screen according to claim 1 wherein the energy treated topcoat has applied thereto an anionic antistat of mixed mono- and dialkyl phosphates of the general structure $RH_2PO_4$ and $R_2HPO_4$, where R is alkyl of 8 to 10 carbon atoms.

8. An X-ray intensifying screen according to claim 1 wherein the energy treated topcoat has applied thereto a cationic antistat of a quaternary ammonium derivative of a fatty imidazoline.

9. An X-ray intensifying screen according to claim 1 wherein the energy treated topcoat has applied thereto a nonionic antistat of an ethoxylated amine.

10. An X-ray intensifying screen according to claim 1 wherein the protective topcoat is a flexible film of a short chain telomer of tetrafluoroethylene.

11. An X-ray intensifying screen according to claim 1 wherein the protective topcoat is a flexible film of a mixture of a short chain telomer of tetrafluoroethylene and a copolymer of (1) a fluoroester of the formula:

$$CF_3-CF_2-(CF_2-CF_2)_n-CH_2-CH_2-O-\overset{\overset{\Large O}{\|}}{C}-\overset{\overset{\Large CH_3}{|}}{C}=CH_2$$

wherein n is an integer from 2 to 9, and (2) methylmethacrylate.

12. An X-ray intensifying screen according to claim 1 wherein the protective topcoat is a flexible film of a copolymer of perfluorodimethyldioxole and tetrafluoroethylene.

13. An X-ray intensifying screen according to claim 1 wherein the antistat agent is applied in the absence of a solvent.

14. A pair of X-ray intensifying screens according to claim 1 in combination with a double side coated photosensitive X-ray film.

15. An X-ray intensifying screen according to claim 1 in combination with a single side coated photosensitive X-ray film.

* * * * *

UNITED STATES PATENT AND TRADEMARK OFFICE

CERTIFICATE OF CORRECTION

PATENT NO. : 4,666,774

DATED : May 19, 1987

INVENTOR(S) : THEODORE P. CHRISTINI

It is certified that error appears in the above-identified patent and that said Letters Patent is hereby corrected as shown below:

Cover page, left column, after "[76] Inventor: Theodore P. Christini, R.D. 1, Box 31, Dushore, PA 18614," insert --[73] Assignee: E. I. Du Pont de Nemours and Company, Wilmington, DE 19898.

Signed and Sealed this

Twenty-fifth Day of August, 1987

*Attest:*

DONALD J. QUIGG

*Attesting Officer* *Commissioner of Patents and Trademarks*